United States Patent [19]

Kubota et al.

[11] Patent Number: 5,468,780
[45] Date of Patent: Nov. 21, 1995

[54] METHOD OF RECYCLING UNSATURATED POLYESTER RESIN WASTE

[75] Inventors: Shizuo Kubota; Osamu Ito; Hiroyuki Miyamoto, all of Wakayama, Japan

[73] Assignee: Miyaso Chemical Co., Tanabe, Japan

[21] Appl. No.: 398,689

[22] Filed: Mar. 6, 1995

[30] Foreign Application Priority Data

Jun. 21, 1994 [JP] Japan ................................. 6-138762
Dec. 20, 1994 [JP] Japan ................................. 6-316285

[51] Int. Cl.$^6$ ................................................. C08J 11/04
[52] U.S. Cl. .................... 521/48.5; 525/437; 525/438; 525/440; 528/80; 528/83; 528/85; 528/272; 528/275; 528/288; 528/302; 528/303; 528/308; 528/308.6
[58] Field of Search ................... 521/48.5; 525/437, 525/438, 440; 528/80, 83, 85, 272, 275, 288, 302, 303, 308, 308.6

[56] References Cited

U.S. PATENT DOCUMENTS

| | | | |
|---|---|---|---|
| 4,284,760 | 8/1981 | Millick, III et al. | 528/306 |
| 4,299,927 | 11/1981 | Dombroski | 525/64 |
| 4,469,823 | 9/1984 | Yeakey et al. | 521/172 |
| 4,506,090 | 3/1985 | Brennam et al. | 560/91 |
| 5,120,768 | 6/1992 | Sisson | 521/46.5 |
| 5,223,544 | 6/1993 | Burkett et al. | 521/48 |
| 5,252,615 | 10/1993 | Rao et al. | 521/48.5 |
| 5,371,112 | 12/1994 | Sayre et al. | 521/48 |
| 5,380,793 | 1/1995 | Pepper | 525/48 |
| 5,399,429 | 3/1995 | Asrar | 428/364 |

*Primary Examiner*—Samuel A. Acquah
*Attorney, Agent, or Firm*—Armstrong, Westerman, Hattori, McLeland & Naughton

[57] ABSTRACT

Unsaturated polyester resin waste is glycolytically degraded to obtain industrially useful glycolic raw material. It is possible to synthesize unsaturated polyester resin by reacting this glycolic raw material with unsaturated dibasic acid and saturated dibasic acid. It is also possible to synthesize polyurethane resin by reacting the glycolic raw material with a diisocyanate compound.

14 Claims, No Drawings

METHOD OF RECYCLING UNSATURATED POLYESTER RESIN WASTE

BACKGROUND OF THE INVENTION

1. Field of the Invention

The present invention relates to a method of recycling unsaturated polyester resin waste, and more particularly, it relates to a method of recycling unsaturated polyester resin waste by chemically treating the same and obtaining industrially valuable raw material.

2. Description of the Background Art

For example, most of buttons are made of unsaturated polyester resin. Such buttons are manufactured by punching out an unsaturated polyester resin sheet and cutting out the intermediate products as obtained. In the manufacturing steps, however, about 50% of the raw material is wasted as chippings and shavings. The problem of waste disposal also arises in relation to fiber reinforced plastic products such as FRP ships and bathtubs having matrices of unsaturated polyester resin. Thus, it is desirable to recycle such unsaturated polyester resin waste.

However, it is impossible to remelt and remold waste of the unsaturated polyester resin, which is thermosetting resin having a three-dimensional network structure, dissimilarly to that of thermoplastic resin such as polypropylene, for example. Further, the unsaturated polyester resin cannot be dissolved in a solvent.

To this end, there has been made study on a method of pulverizing fiber reinforced plastic (FRP) waste having a matrix of unsaturated polyester resin and recycling the same as a filler (Yoshihiro Fukuda, Kagaku to Kogyo (Osaka), 68 (2), 60 (1994)). However, the inventors have confirmed that this method encounters such a problem that the strength of the recycled resin, which is reduced as the amount of the waste powder is increased, entirely depends on the amount of new unsaturated polyester resin.

There has been made another study on a method of degrading the aforementioned FRP under a steam atmosphere at a temperature of 500° C. for obtaining components such as phthalic acid (Yoshinari Kobayashi, Kagaku to Kogyo (Osaka), 66 (10), 452 (1992); Kazuhide Hamada, Jun Hosokawa and Masashi Nishiyama, Kobunshi Ronbunshu, 49 (8), 655 (1992)). However, the high temperature of 500° C. is necessary for thermally degrading the FRP, and hence this method inevitably requires a specific equipment. Further, glass fiber contained in the FRP is deteriorated due to the high temperature.

SUMMARY OF THE INVENTION

Accordingly, an object of the present invention is to provide a method of recycling unsaturated polyester resin waste by chemically treating the same and obtaining industrially valuable raw material with a simple equipment, i.e., a method of chemically recycling unsaturated polyester resin waste.

In order to solve the aforementioned technical problems, the inventive method of recycling unsaturated polyester resin waste comprises a step of glycolytically degrading unsaturated polyester resin waste thereby obtaining glycolic raw material.

The present invention is applicable to recycling of not only waste of the aforementioned resin employed for manufacturing buttons, but general unsaturated polyester resin waste. The unsaturated polyester resin to which the present invention is applied may contain a filler of calcium carbonate or the like, or may be composed with glass fiber or the like.

According to the present invention, the unsaturated polyester resin waste is preferably crushed and thereafter glycolytically treated, so that glycolytic degradation thereof is further facilitated. The waste can be crushed with a hammer or chain type impact crusher, a shear crusher, a cutting crusher, a roll, conveyor or screw type compression crusher, a stamp mill, a ball mill, a rod mill or the like. The grain size of the waste powder obtained by such crushing is preferably minimized, such that powder which is passed through a screen having meshes of 300 μm is advantageously employed, for example.

According to the present invention, glycol which is employed for the glycolysis is prepared from ethylene glycol, propylene glycol, diethylene glycol, dipropylene glycol, neopentyl glycol, 1,3-butanediole, 1,6-hexanediole, bisphenol A hydride, bisphenol A propylene oxide adduct, dibromoneopentyl glycol or the like.

In the glycolysis, a catalyst is preferably employed. This catalyst is prepared from sodium methylate, sodium ethylate, sodium hydroxide, methanesulfonic acid, or metal acetate such as zinc acetate, magnesium acetate, calcium acetate, lithium acetate or sodium acetate, for example. However, it is possible to carry out the glycolysis without employing such a catalyst.

In the glycolysis, a temperature of about 150° to 250° is preferably supplied. The upper limit of the temperature range of about 250° C. is selected in relation to the boiling point of the glycol as employed, so that the glycol can maintain its liquid state. This upper limit temperature is preferably selected at a degree not substantially oxidizing the glycol.

When waste FRP is treated, the temperature which is supplied in the glycolysis will not deteriorate the glass fiber contained in the FRP, and hence the glass fiber can be recycled.

The glycolysis is preferably carried out under a nitrogen atmosphere, in order to prevent oxidation of the glycol.

According to the present invention, as hereinabove described, it is possible to obtain industrially useful glycolic raw material from the unsaturated polyester resin waste. The glycolysis for obtaining such glycolic raw material can be carried out at a relatively low temperature through a relatively simple operation, whereby the unsaturated polyester resin waste can be recycled with a relatively simple equipment.

The glycolic raw material obtained in the aforementioned manner can be effectively used as raw material for obtaining industrially useful resin. For example, it is possible to synthesize unsaturated polyester resin by reacting the glycolic raw material with dibasic acid, for example. Further, it is also possible to synthesize polyurethane resin by reacting the glycolic raw material with a diisocyanate compound.

The dibasic acid employed for synthesizing the unsaturated polyester resin includes unsaturated dibasic acid and saturated dibasic acid, both of which are employed in general. Examples of the unsaturated dibasic acid are maleic anhydride, fumaric acid and itaconic acid. Examples of the saturated dibasic acid are phthalic anhydride, isophthalic acid, terephthalic acid, tetrahydrophthalic anhydride, methyltetrahydrophthalic anhydride, endomethylenetetrahydrophthalic anhydride, adipic acid, sebacic acid, chlorendic acid (1,4,5,6,7,7-hexachlorobicylo [2,2,1]-5-heptene-2,3-dicarboxylic acid), and tetrabromophthalic anhydride. The terephthalic acid can be prepared from that discharged through alkali reduction of polyester fiber.

The unsaturated polyester resin can be synthesized by an ordinary method of setting a reaction temperature of 140° C. to 230° C., condensing the material for 2 to 6 hours while distilling water away under nitrogen, cooling the reactant, thereafter introducing 30 to 40% of styrene therein, and adding 0.02 part of hydroquinone for serving as a polymerization inhibiter.

On the other hand, the diisocyanate compound which is reacted with the glycolic raw material for synthesizing polyurethane resin is prepared from toluene diisocyanate, diphenylmethane diisocyanate (MDI), naphthalene diisocyanate, tolidine diisocyanate, hexamethylene diisocyanate, isophorone diisocyanate, p-phenylene diisocyanate, transcyclohexane 1,4-diisocyanate, xylylene diisocyanate (XDI), hydrogeneration XDI, hydrogeneration MDI, lysine diisocyanate, or tetramethylxylene diisocyanate. The polyurethane resin can be synthesized by an ordinary method.

The unsaturated polyester resin or the polyurethane resin recycled in the aforementioned manner can be employed as a molding material, an adhesive or a paint. Such resin is molded by an ordinary molding method such as hand lay up molding, compression molding, cast molding, injection molding, reaction injection molding, transfer molding or the like.

DESCRIPTION OF THE PREFERRED EMBODIMENTS

The present invention is now described in more concrete terms with reference to Examples.

In the following Examples, chippings of buttons consisting of unsaturated polyester resin were crushed by a crusher MIYAKO DM-6 (by Miyako Product Co., Inc., rotational frequency: 28,000/min., capacity: 150 g), and the powder materials as obtained were passed through screens having meshes of 300 μm for preparing samples.

EXAMPLE 1

Glycolysis with EtONa Catalyst 10 g of unsaturated polyester resin waste, 100 g of ethylene glycol, and 2 g of EtONa were introduced into a 1L three-necked round bottom flask provided with a stirrer and a cooler, and treated at 180° C. for 5 hours and then at 200° C. for 8 hours respectively. The reactant obtained by such treatment was filtered, washed with tetrahydrofuran (THF), and dried. 4.5636 g of remainder resin was filtered out, with a degradation rate of 54.4%. A THF solution was prepared from the degradation product, the molecular weight of which was measured through gel permeation chromatography (GPC) with reference to standard polystyrene, to observe values of number-average molecular weight and (weight-average molecular weight)/(number-average molecular weight) of 138 and 1.05 respectively.

EXAMPLE 2

Glycolysis with $CH_3SO_3H$ Catalyst 10 g of unsaturated polyester resin waste, 100 g of ethylene glycol, and 2 g of methanesulfonic acid were introduced into a round bottom flask which was similar to that employed in Example 1, and treated at 180° C. for 5 hours and then at 205° C. for 8 hours respectively. The reactant obtained by such treatment was filtered, washed with THF, and dried. 6.6807 g of remainder resin was filtered out, with a degradation rate of 33.2%. The degradation product was subjected to measurement of the molecular weight similarly to Example 1, to exhibit values of number-average molecular weight and (weight-average molecular weight)/(number-average molecular weight) of 186 and 1.06 respectively.

EXAMPLE 3

Glycolysis with MeONa Catalyst 20 g of unsaturated polyester resin waste, 40 g of ethylene glycol, 2 g of sodium methylate, and 50 ml of dimethylformamide (DMF) were introduced into a round bottom flask which was similar to that employed in Example 1 and treated at 150° C. for 5 hours, the DMF was distilled away, and thereafter the mixture was further treated at 205° C. for 8 hours. The reactant obtained by such treatment was filtered, washed with THF, and dried. 10.2216 g of remainder resin was filtered out, with a degradation rate of 48.89%.

EXAMPLE 4

Glycolysis with No Catalyst 10 g of unsaturated polyester resin waste and 100 g of ethylene glycol were introduced into a round bottom flask which was similar to that employed in Example 1, and treated at 205° C. for 13 hours. The reactant obtained by such treatment was filtered, washed with THF, and dried. 6.0431 g of remainder resin was filtered, with a degradation rate of 39.57%.

EXAMPLE 5

Glycolysis under Relatively Low Temperature 10 g of unsaturated polyester resin waste, 20 g of ethylene glycol, 100 ml of THF, and 1 g of EtONa were introduced into a round bottom flask which was similar to that employed in Example 1, and treated at 70° C. for 13 hours. The reactant obtained by such treatment was filtered, washed with THF, and dried. 9.7670 g of remainder resin was filtered out, with a degradation rate of 2.3%.

EXAMPLE 6

Glycolysis with NaOH Catalyst 10 g of unsaturated polyester resin waste, 40 g of ethylene glycol, and 2 g of sodium hydroxide were introduced into a round bottom flask which was similar to that employed in Example 1, and treated at 205° C. for 9 hours. The reactant obtained by such treatment was filtered, washed with THF, and dried. 4.2357 g of remainder resin was filtered out, with a degradation rate of 57.64%.

EXAMPLE 7

Glycolysis with NaOH Catalyst 100 g of unsaturated polyester resin waste, 120 g of ethylene glycol, and 1 g of sodium hydroxide were introduced into a round bottom flask which was similar to that employed in Example 1, and treated at 205° C. for 24 hours. The reactant obtained by such treatment was filtered, washed with THF, and dried. 46.0 g of remainder resin was filtered out, with a degradation rate of 54.0%.

Further, 2 g of sodium hydroxide, 2g of sodium ethylate and 250 g of diethylene glycol were added to 46.0 g of the remainder resin, and the mixture was introduced into a round bottom flask similarly to the above, to be treated at 245° C. for 8.5 hours. Then, the reactant as obtained was filtered similarly to the above, washed with THF, and dried. 0.8 g of remainder resin was filtered out, with a degradation rate of 98.3%.

EXAMPLE 8

Glycolysis of FRP Waste 100 g of FRP waste, 150 g of ethylene glycol, and 1 g of sodium hydroxide were introduced into a round bottom flask which was similar to that employed in Example 1, treated at 205° C. for 5 hours, and further treated at 245° C. for 9 hours. The reactant obtained by such treatment was filtered, washed with THF, and dried. 76.52 g of remainder resin was filtered out, with a degradation rate of 23.43%.

EXAMPLE 9

Glycolysis with Zinc Acetate Catalyst 10 g of unsaturated polyester resin waste, 40 g of ethylene glycol, and 0.5 g of zinc acetate were introduced into a round bottom flask which was similar to that employed in Example 1, and treated at 205° C. for 7 hours. The reactant obtained by such treatment was filtered, washed with THF, and dried. 5.8665 g of remainder resin was filtered out, with a degradation rate of 41.34%.

EXAMPLE 10

Glycolysis with Propylene Glycol 10 g of unsaturated polyester resin waste, 40 g of propylene glycol, and 2 g of sodium methylate were introduced into a round bottom flask which was similar to that employed in Example 1, and treated at 205° C. for 9 hours. The reactant obtained by such treatment was filtered, washed with THF, and dried. 7.6956 g of remainder resin was filtered out, with a degradation rate of 23.04%. Values of number-average molecular weight and (weight-average molecular weight)/(number-average molecular weight) obtained through GPC were 293 and 1.03 respectively.

EXAMPLE 11

Glycolysis with Propylene Glycol 20 g of unsaturated polyester resin waste, 40 g of propylene glycol, and 2 g of sodium ethylate were introduced into a round bottom flask which was similar to that employed in Example 1, and treated at 205° C. for 10 hours. The reactant obtained by such treatment was filtered, washed with THF, and dried. 15.3695 g of remainder resin was filtered out, with a degradation rate of 23.15%.

EXAMPLE 12

Synthesis of Recycled Unsaturated Polyester Resin

The ethylene glycol degradation product (degradation product of 9.7784 g and ethylene glycol of 40 g; 0.644 mol) obtained in Example 3 was neutralized with hydrochloric acid, 74.8 g (0.644 mol) of maleic acid was added thereto, water was distilled away under nitrogen, and the mixture was reacted at 210° C. for 2 hours, to obtain 92.1 g of recycled unsaturated polyester resin. Through GPC, the resin as obtained exhibited values of number-average molecular weight and (weight-average molecular weight)/(number-average molecular weight) of 1,121 and 1.38 respectively.

EXAMPLE 13

Synthesis of Recycled Unsaturated Polyester Resin

The propylene glycol degradation product (degradation product of 4.6305 g and propylene glycol of 40 g; 0.525 mol) obtained in Example 11 was neutralized with hydrochloric acid, and 20.6 g (0,210 mol) of maleic acid and 46.7 g (0.315 mol) of phthalic anhydride were added thereto, water was distilled away under nitrogen, and the mixture was reacted at 210° C. for 4 hours, to obtain 68.9 g of recycled unsaturated polyester resin. Through GPC, the resin as obtained exhibited values of number-average molecular weight and (weight-average molecular weight)/(number-average molecular weight) of 1,508 and 2.01 respectively. For the purpose of comparison, it is pointed out that "Polylite 210M" by Dainippon Ink and Chemicals, Inc. has values of number-average molecular weight and (weight-average molecular weight)/(number-average molecular weight) of 1,646 and 3.26 respectively.

45.9 g of styrene was added to 68.9 g of the unsaturated polyester resin obtained in the aforementioned manner, with addition of 1% each of methyl ethyl ketone peroxide and cobalt naphthenate with respect to the total weight of the unsaturated polyester resin and the styrene to obtain a resin composition, which in turn was castmolded under conditions of precuring at 25° C. for 2 hours and postcuring at 70° C. for 2 hours. The molding as obtained exhibited bending strength of 132.2 MPa, while a molding of the aforementioned "Polylite 210M" exhibited bending strength of 92.1MPa.

EXAMPLE 14

Synthesis of Recycled Unsaturated Polyester Resin

The propylene glycol degradation product (degradation product of 4.6305 g and propylene glycol of 40 g; 0.525 mol) obtained in Example 11 were neutralized with hydrochloric acid, 20.6 g (0.210 mol) of maleic anhydride and 52.3 g (0.315 mol) of terephthalic acid discharged in reduction of polyester fiber were added thereto, water was distilled away under nitrogen, and the mixture was reacted under 210° C. for 4 hours, to obtain 69.5 g of recycled unsaturated polyester resin. Through GPC, values of number-average molecular weight and (weight-average molecular weight)/(number-average molecular weight) of the resin as obtained were 1,500 and 2.00 respectively.

EXAMPLE 15

Recycling of Glass Fiber 50 g of unsaturated polyester resin "Polylite BS210M" by Dainippon Ink and Chemicals, Inc., containing 30 to 40% of styrene, was prepared with addition of 1% each of methyl ethyl ketone peroxide and cobalt naphthanate with respect to the weight of the "Polylite BS210M" and 15 g of the glass fiber recovered in Example 8, to obtain a composite resin composition. This composite resin composition was castmolded under conditions of precuring at 25° C. for 2 hours and postcuring at 70° C. for 2 hours. The molding as obtained exhibited bending strength of 140 MPa. For the purpose of comparison, it is pointed out that a mixture prepared in the aforementioned manner with no addition of the glass fiber and a commercially available FRP tank containing 30% of glass fiber exhibited bending strength values of 92.1 MPa and 134 MPa respectively.

EXAMPLE 16

Synthesis of Recycled Polyurethane Resin 50 g of the ethylene glycol degradation product obtained in Example 3 was neutralized with hydrochloric acid, and 0.05 g of triethylenediamine and 0.15 g of tin octenate (II) were added to and mixed with the same. 25 g of toluene diisocyanate was added to and further mixed with this mixture, which in turn was reacted at 100° C. for 1 hour, to obtain polyurethane resin.

What is claimed is:

1. A method of recycling unsaturated polyester resin waste, comprising the steps of:

preparing unsaturated polyester resin waste; and glycolytically degrading said unsaturated polyester resin waste, thereby obtaining glycolic raw material.

2. A method in accordance with claim 1, wherein said step of preparing said unsaturated polyester resin waste includes a step of crushing said unsaturated polyester resin waste.

3. A method in accordance with claim 2, wherein said step of preparing said unsaturated polyester resin waste further includes a step of screening crushed said unsaturated polyester resin waste.

4. A method in accordance with claim 3, wherein a screen having meshes of not more than 300 μm is employed in said screening step.

5. A method in accordance with claim 1, wherein said unsaturated polyester resin waste includes waste of a fiber reinforced plastic product containing glass fiber.

6. A method in accordance with claim 1, wherein said step of glycolytically degrading said unsaturated polyester resin waste includes a step of adding glycol to said unsaturated polyester resin waste.

7. A method in accordance with claim 6, wherein said glycol includes one selected from the group consisting of ethylene glycol, propylene glycol, diethylene glycol, dipropylene glycol, neopentyl glycol, 1,3-butanediole, 1,6-hexanediole, bisphenol A hydride, bisphenol A propylene oxide adduct, and dibromoneopentyl glycol.

8. A method in accordance with claim 6, wherein said step of glycolytically degrading said unsaturated polyester resin waste further includes a step of adding a catalyst to said unsaturated polyester resin waste.

9. A method in accordance with claim 8, wherein said catalyst includes one selected from the group consisting of sodium methylate, sodium ethylate, sodium hydroxide, methanesulfonic acid, and metal acetate.

10. A method in accordance with claim 1, wherein a temperature of 150° C. to 250° C. is supplied in said step of glycolytically degrading said unsaturated polyester resin waste.

11. A method in accordance with claim 1, further comprising a step of synthesizing unsaturated polyester resin by reacting said glycolic raw material with dibasic acid.

12. A method in accordance with claim 11, wherein said dibasic acid includes unsaturated dibasic acid selected from the group consisting of maleic anhydride, fumaric acid and itaconic acid, and saturated dibasic acid selected from the group consisting of phthalic anhydride, isophthalic acid, terephthalic acid, tetrahydrophthalic anhydride, methyltetrahydrophthalic anhydride, endomethylenetetrahydrophthalic anhydride, adipic acid, sebacic acid, chlorendic acid (1,4,5,6,7,7-hexachlorobicyclo [2,2,1]-5-heptene-2,3-dicarboxylic acid), and tetrabromophthalic anhydride.

13. A method in accordance with claim 1, further comprising a step of synthesizing polyurethane resin by reacting said glycolic raw material with a diisocyanate compound.

14. A method in accordance with claim 13, wherein said diisocyanate compound includes one selected from the group consisting of toluene diisocyanate, diphenylmethane diisocyanate (MDI), naphthalene diisocyanate, tolidine diisocyanate, hexamethylene diisocyanate, isophorone diisocyanate, p-phenylene diisocyanate, transcyclohexane 1,4-diisocyanate, xylylene diisocyanate (XDI), hydrogeneration XDI, hydrogeneration MDI, lysine diisocyanate and tetramethylxylene diisocyanate.

* * * * *